J. A. JOHNSON.
Plow.

No. 159,267.  Patented Feb. 2, 1875.

Attest:
Wm Bagger
C. H. White

Inventor:
John A. Johnson,
by Louis Bagger,
his atty.

UNITED STATES PATENT OFFICE.

JOHN A. JOHNSON, OF ST. PAUL, MINNESOTA.

IMPROVEMENT IN PLOWS.

Specification forming part of Letters Patent No. 159,267, dated February 2, 1875; application filed December 18, 1874.

*To all whom it may concern:*

Be it known that I, JOHN A. JOHNSON, of St. Paul, in the county of Ramsey and State of Minnesota, have invented certain new and useful Improvements in Plows; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention consists in the combination of a horizontal reverse cutter with land-sides of plows, substantially as and for the purpose hereinafter set forth.

Figure 1:
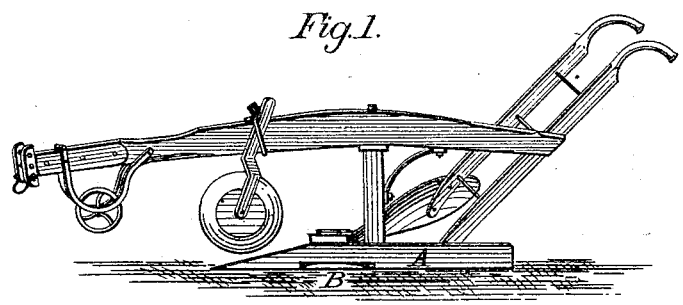
Figure 2:
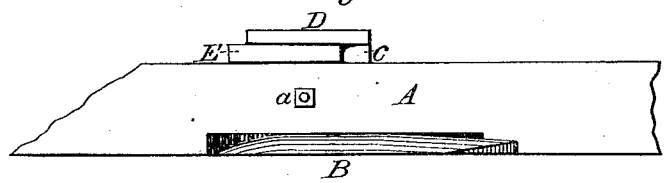
Figure 3:
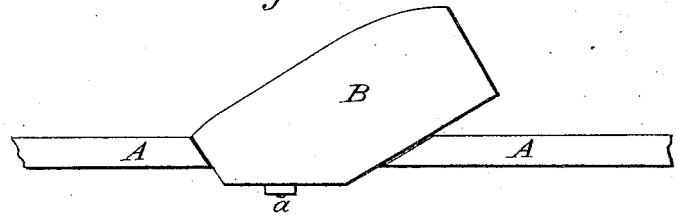
Figure 4:
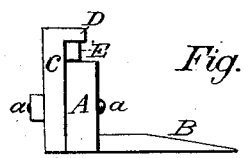
Figure 5:
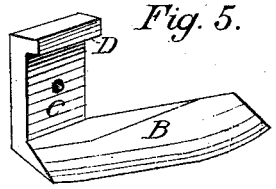

In the drawing, Figure 1 is a perspective view of a plow having my improvement. Fig. 2 is a side elevation of a land-side with my improvement. Fig. 3 is a plan view of the under side of a land-side having my improvement. Fig. 4 is a front elevation of the same with the share removed, and Fig. 5 is a perspective view of the cutter detached from the land-side.

Similar letters of reference indicate corresponding parts in all the figures.

The land-side A has a cut or slot in its bottom part for the admission of the horizontal cutter-blade B. The latter is secured permanently at right angles to an upright, C, of a height somewhat exceeding the depth of the land-side, and terminating in the horizontal flange D. The upright C is secured adjustably to the land-side by a bolt, *a;* and the position of the cutter-blade in its relation to the land-side is further adjusted and controlled by a wedge, E, inserted between the top of the land-side and the projecting flange D.

From the foregoing description it will be observed that the cutter may readily be removed by removing the bolt *a*, and also that the cutter-blade may be tilted up or down by loosening the bolt *a* and inserting small wedges between the land-side and the upright part of the cutter either above or below the bolt. By this arrangement important advantages are gained, as I shall subsequently show.

The advantages of my improvement are principally these, that the cutter being adjustable, if the plow gets out of order, so that it does not run evenly or cut the furrow of uniform depth, the cutter-blade may be so adjusted, by tilting up or down, as to cause the plow to cut its furrow of uniform depth; also, the furrow being cut partially on both sides of the plow at the same time, the strain on the plow is much more even than on plows of the ordinary construction; and, further, the cutter, being held in its position by the bolt *a* and wedge E, may be readily removed for sharpening or repairs whenever necessary. By detaching the cutter the plow will do service as an ordinary plow.

Having thus described my improvement, I claim and desire to secure by Letters Patent of the United States—

1. The combination of the laterally-projecting blade B, upright C, and flange D, substantially as and for the purpose hereinbefore set forth.

2. The combination of the cutter attachment, formed by the blade B, upright C, and flange D, with the bolt *a*, wedge E, and land-side A, substantially as and for the purpose hereinbefore set forth.

In testimony that I claim the foregoing as my own I have hereunto affixed my signature in presence of two witnesses.

JOHN A. JOHNSON.

Witnesses:
CHAS. R. RIEBSAM,
E. M. FULLER.